Feb. 17, 1970  H. J. WATSON ET AL  3,495,915
PHOTOELECTRIC PROBE DETECTING AND MEASURING APPARATUS
Filed June 27, 1966
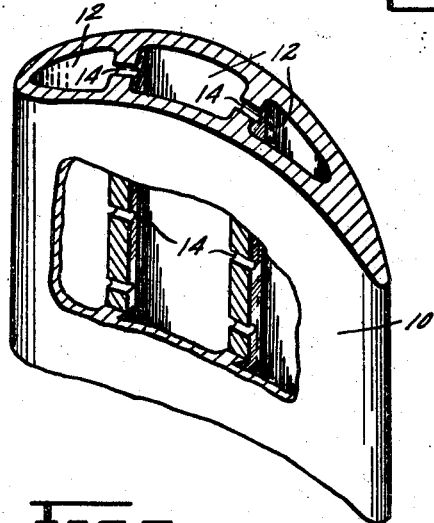
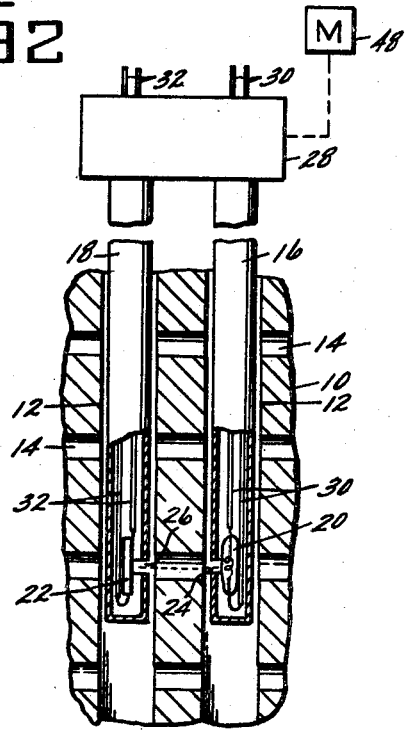
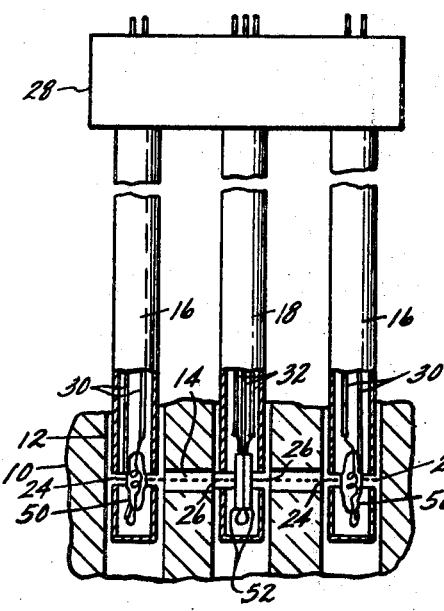
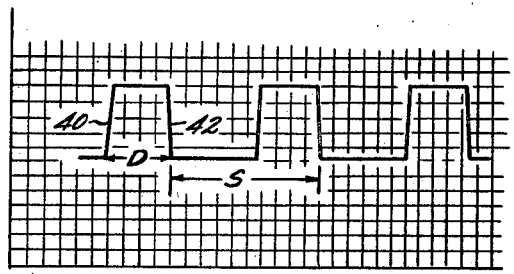
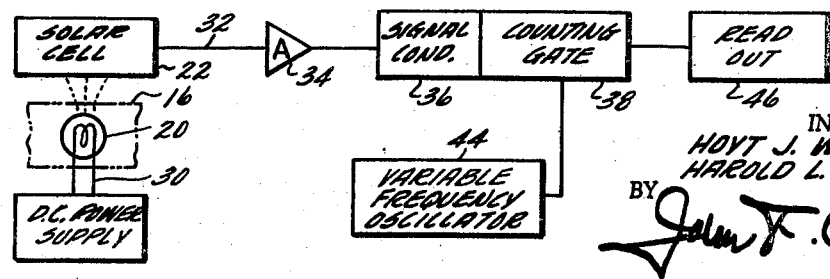
INVENTORS.
HOYT J. WATSON
HAROLD L. SEEKINS
BY
ATTORNEY—

United States Patent Office 3,495,915
Patented Feb. 17, 1970

3,495,915
PHOTOELECTRIC PROBE DETECTING AND
MEASURING APPARATUS
Hoyt J. Watson, Loveland, and Harold L. Seekins, Green Hills, Ohio, assignors to General Electric Company, a corporation of New York
Filed June 27, 1966, Ser. No. 560,775
Int. Cl. G01b 11/12
U.S. Cl. 356—167                                    9 Claims

ABSTRACT OF THE DISCLOSURE

The invention is directed to a detecting and measuring apparatus for small transverse passages that connect longitudinal ducts internally of a workpiece. Needle-like probes are inserted in the ducts and carry energy transmitting or energy receiving means to detect the presence and size of the transverse passages.

---

Many work pieces, such as component parts as used in jet engines, require internal cooling. Specifically, in the present state of the art higher temperatures are used in gas turbines and the turbine blades, as well as other components, require cooling. This is accomplished generally by ducting cooling air through intricate internal passages in the blade. One of the problems encountered in such a structure having intricate and blind inaccessible passages is the need to detect and measure such passages. It is necessary to know if the passages intersect properly and the actual size of the passages. Thus, the characteristic to be measured is totally concealed and inaccessible since it is buried within the work piece and standard measurng means are inadequate. Means have been tried to determine qualitatively the presence of the passages by the use of air which may be passed through the passages and its presence picked up by some suitable thermal detector. Such a scheme is not practical because the impingement of the air has caused fatigue on the small leads of the thermal detector and the detector has failed. Additionally, inspection by X-ray does not provide sufficient resolution to indicate any quantitative data or idea of size and it does not reliably indicate proper intersection of the passages. If the passages are off-set in different planes, a plan view by means of X-ray would show the passages as intersecting. Furthermore, the passages that must be measured are very minute in size varying from about one hundred thousandths to as small as twenty to thirty thousandths of an inch. It is generally known to use photoelectric means to detect the presence of objects and count them and such means have been used in many applications well known in the prior art.

The main object of the present invention is to provide a detecting and measuring apparatus which gives qualitative and quantitative data on internal and blind transverse passages concealed in a work piece.

Another object is to provide such an apparatus which senses the presence of the passages and reads out their size for quantitative data indication.

A further object is to provide such an apparatus wherein transducers of probes and energy transmitting means are used to determine the presence and size of the transverse passages leading off of longitudinal ducts internally in a work piece.

Another object is to provide a readout system in combination with the detecting and measuring apparatus whereby qualitative and quantitative data may be obtained on the transverse passages.

A further object is to provide such an apparatus wherein the use of a plurality of energy transmitting means on one probe permits a reduction in the number of probes required for a given work piece.

Briefly stated, the invention provides a detecting and measuring apparatus for small transverse passages that connect longitudinal ducts internally of a work piece, the apparatus comprising at least two probes for insertion in a pair of adjacent ducts in the work piece. Energy transmitting means is carried by one of the probes and is directed transversely of its longitudinal axis. Energy receiving means is carried by the adjacent probe and the receiving means is connected to a readout system. The probes are suitably mounted and means is provided to move the probes at a predetermined and preferably constant velocity longitudinally of the work piece to generate signals between the energy means and through the transverse passages to detect their presence and size and record them on the readout means. Additional structure is disclosed wherein the energy means may be fanned through collimating slots for wider range of detecting and the probes may be made flexible to follow slight deviations of the longitudinal ducts. Conveniently, light energy transmitting means and solar cell energy receiving means are carried on adjacent probes and may direct or receive the energy on both sides of the longitudinal axis of the probes to reduce the number of probes required in a multi-duct work piece.

While the specification concludes with claims particularly pointing out and distinctly claiming the subject matter whch is regarded as the invention, it is believed the invention will be better understood from the following description taken in connection with the accompanying drawing in which:

FIGURE 1 is a partial perspective view of a typical work piece turbine blade containing transverse passages;

FIGURE 2 is a partial enlarged cross-sectional diagrammatic view of transverse passages and the probes using a light and solar cell energy structure;

FIGURE 3 is a view similar to FIGURE 2 showing a modification that permits using fewer probes;

FIGURE 4 is a diagrammatic circuit arrangement with a typical readout device to give qualitative and quantitative information, and FIGURE 5 is a partial view of a typical square wave tracing that may be used in the circuitry of FIGURE 4.

Referring first to FIGURE 1, by way of illustration and example only, the invention will be illustrated in connection with a turbine blade 10 that has internal longitudinal ducts 12 for the passage of cooling fluid. In order to properly direct the cooling fluid through blade 10, the internal ducts 12 are interconnceted by suitably spaced transverse passages 14 to provide a sinuous fluid passage throughout the blade for adequately cooling the blade or work piece. Such structure is shown in U.S. Patent 3,051,439 in FIG. 4 et seq. as it might be applied to a high temperature turbine in a jet engine.

As can be seen from FIG. 1, for inspection, it is difficult to determine the presence and size of transverse passages 14 because they are inaccessible and concealed within the work piece or blade 10. Referring next to FIG. 2, a diagrammatic enlarged section is shown illustrating the transverse passage 14 in the work piece 10. It is desired to perform two functions with respect to these transverse passages. First their presence and proper intersection with the longitudinal ducts 12 must be determined and second, the size or diameter must be determined. In order to obtain this qualitative and quantitative data on the passages, there is provided a pair of probes 16 and 18 which may consist of elongated hollow tubing of suitable material, such as stainless steel, and of suitable length depending on the work piece to be examined. It will be seen that these probes are adapted for insertion in a pair of adjacent ducts 12 as seen in FIG. 2. To determine the presence of a transverse passage 14, one of the probes 16 is provided with energy transmitting means 20 which may conveniently be in the form of a miniature electric light. Any other suitable transmitting means, such as infra-red, may also be used but an electric light is preferred for most applications. Opposite, in similar probe 18, there is provided an energy receiving means 22 that may be in the form of a photo-voltaic sensor that generates voltage as a result of the light source falling upon it. This is a photoelectric cell or, in this size, better known as a solar cell. Of course, the energy transmitting and receiving means must be compatible so that if an infra-red source is used, a sensor compatible with it would be provided in probe 18 and similarly with any other energy means. The transmitting means 20 is directed transversely of its general probe longitudinal axis as seen in FIG. 2 and is aligned with the receiving means 22 to complete a circuit when permitted through transverse passages 14. In order to ensure the transmission and receipt of energy, it is preferable to provide the tubular probes 16 and 18 with suitable peripheral collimating slots 24 and 26 respectively to provide a fan-like energy transmitter and receiving means. This tends to eliminate any offsetting characteristics that might be encountered if a pinpoint or straight line energy transmission were used. These slots are nothing more than precision saw-slots that may extend, as shown in FIG. 2, around approximately 180° of the tube probes.

In order to maintain the alignment of the energy means and for another purpose to be described, there is provided a mounting means 28 that carries the probes in a transverse spaced arrangement at one end cantilever-like for insertion in the ducts 12. Any suitable electrical leads 30 and 32 may be used to transmit and receive energy from the energy means 20 and 22 respectively. Additionally, the probe or tube wall itself may form one of the leads thus necessitating only single leads 30 and 32.

It will be seen that, as the probes are inserted longitudinally in the adjacent ducts 12, a signal will be generated and transmitted between the energy means through the transverse passages 14 as the respective slots 24 and 26 align themselves with the passage on the movement of the probes. At this point, it should be appreciated that the transverse passages may be otherwise than right angular as shown as long as the alignment between the adjacent probes permits the generation of a signal through the transverse passage and this is intended by the signal transmission transversely of the longitudinal axis. Additionally, the longitudinal passages may deviate slightly from absolute parallelism, as they might in a turbine blade, and the provision of a thin-walled flexible tube for the probes 18 and 20 permits the probes to follow such slightly deviating ducts and still provide the reading.

Suitable readout system means, as shown diagrammatically in FIG. 4, may be provided to be connected to lead 32 to convert the signal into an intelligible and quantitative piece of data. It will be appreciated that the signal generated by the solar cell or energy receiving means 22 will be very small so that it may be necessary to provide amplifying means 34 to increase the signal strength. The signal may then be fed into a signal conditioner 36 which produces constant amplitude variable width square wave pulses as shown in FIG. 5. This is a known device that produces an output wave form having the desired characteristic to feed into electronic counting, gated equipment 38 and the signal conditioner 36 is used to turn the counting gate on and off as a function of the rise front 40 and the decay front 42 of the wave train of pulses shown in FIG. 5. A suitable variable frequency oscillator 44 may be provided for comparison purposes so that the total number of cycles are counted and may be read out directly in a printout means 46 directly in thousandths of an inch of diameter of the transverse passage. This occurs, of course, on a very rapid basis. In order for the general readout system, as just described, to provide meaningful quantitative or hole size information, it is necessary that the probes be moved simultaneously by suitable motor means 48 connected to the mounting means 28 for constant velocity or movement at a predetermined rate longitudinally of the ducts. This motion alone produces qualitative evidence of the passages. Movement at constant velocity gives quantitative or hole size information and this is shown by the pulse distance D as shown in FIG. 5, which is representative, by calibration, of the transverse passages, presence as well as their size. Also the passage-to-passage spacing, as shown by S will be evident. FIG. 5 shows what may be given visually on a strip chart recorder as one form of readout. Additionally, the pulses may go directly into a calibrated printout recorder to give numerical quantitative information readout.

It will be appreciated that the plural probe arrangements, where many longitudinal ducts must be inspected for the presence and size of the transverse passages, may be provided as shown in FIG. 3 by using a single light source 50 within each alternate probe and the energy receiving means 52 may be provided within each intermediate probe. As shown in FIG. 3, the receiving means 52 may be directed as a dual arrangement in both directions to avoid the need for an additional probe. Similarly, the light source 50 may be directed in both directions as shown in the bottom of FIG. 3. This alternate and intermediate arrangement merely reduces the number of probes in a multi-probe apparatus. It will be apparent that the movement of the mounting member 28 at a constant predetermined velocity, regardless of the particular velocity, will sequentially generate signals through the series of sequential transverse passages and provide a readout that gives qualitative as well as quantitative information as shown in FIG. 5 through a typical circuitry as shown in FIG. 4. Generally, any suitable readout structure to provide the data in an intelligent form as charts in a strip chart recorder or numerical information in a suitable printout recorder may be employed. FIG. 4 merely represents a typical printout circuit that provides both qualitative and quantitative data.

While there has been described a preferred form of the invention, obviously modifications and variations are possible in light of the above teachings. It is therefore to be understood that within the scope of the appended claims the invention may be practiced otherwise than as specifically described.

What is claimed is:

1. Apparatus for detecting and measuring small transverse passages connecting longitudinal ducts internally in a work piece comprising,
   at least two probes for insertion in a pair of adjacent ducts in said work piece,
   energy transmitting means carried by one of said probes for directing energy transversely of its longitudinal axis,
   energy receiving means carried by the adjacent probe,
   means connected to move said probes simultaneously at a predetermined constant velocity longitudinally of and relative to said ducts of said work piece to generate electrical signals when energy is transferred from said transmitting means through said transverse passages to said receiving means, and
   readout means operatively connected to said receiving means for determining the size of said passageways by the relationship between said constant velocity and the time duration of said signals.

2. Apparatus as described in claim 1 wherein said probes are flexible and parallel, whereby said probes can follow said ducts if said ducts deviate slightly from parallel.

3. Apparatus as described in claim 1 wherein said probes are tubular members and said energy transmitting means is a light source within one tube and said receiving means is a photoelectric cell within the adjacent tube.

4. Apparatus as described in claim 3 wherein each tubular member is provided with a peripheral slot facing the slot on the tubular member in the adjacent duct to provide a fan-like energy transmitter and receiving means.

5. Apparatus for detecting and measuring small transverse passages connecting longitudinal ducts internally in a work piece comprising,
plural longitudinally extending probes,
mounting means carrying said probes transversely spaced at one end for insertion in plural aligned ducts in said work piece,
energy transmitting means carried by each alternate probe for directing energy transversely of its longitudinal axis,
energy receiving means carried by each intermediate probe,
means connected to said mounting means to simultaneously move said probes at a constant velocity in said ducts longitudinally of said work piece and relative thereto to generate electrical signals when energy is transferred from said transmitting means through said transverse passage to said receiving means, and
readout means operatively connected to said receiving means for determining the size of said passageways by the relationship between said constant velocity and the time duration of said signals.

6. Apparatus as described in claim 5 wherein said probes are flexible whereby said probes can follow said ducts if said ducts deviate slightly from parallel.

7. Apparatus as described in claim 5 wherein said energy means on said probes are in alignment through said passages and said probes and mounting member move simultaneously to sequentially generate said signals upon said energy transfer through sequential passages.

8. Apparatus as described in claim 5 wherein said probes are tubular members and said energy transmitting means is a light source within each alternate probe and said receiving means is a photoelectric cell within each intermediate probe.

9. Apparatus as described in claim 8 wherein each tubular member is provided with a peripheral slot facing the slot on the tubular member in an adjacent duct at said energy means to provide a fan-like transmitter and receiving means.

References Cited

UNITED STATES PATENTS

| | | | |
|---|---|---|---|
| 2,324,304 | 7/1943 | Katzman. | |
| 2,382,251 | 8/1945 | Parker et al. | 250—227 |
| 2,499,910 | 3/1950 | Frommer | 356—167 |
| 2,959,089 | 11/1960 | Hett | 356—241 |
| 3,068,739 | 12/1962 | Hicks et al. | 250—227 |
| 3,279,460 | 10/1966 | Sheldon | 356—241 |

FOREIGN PATENTS

| | | |
|---|---|---|
| 56,502 | 1944 | Netherlands. |
| 570,022 | 1945 | Great Britain. |

RONALD L. WILBERT, Primary Examiner

J. ROTHENBERG, Assistant Examiner

U.S. Cl. X.R.

250—224; 356—20, 241